(12) United States Patent  
Byrne

(10) Patent No.: US 11,689,457 B2  
(45) Date of Patent: *Jun. 27, 2023

(54) LINK QUALITY METRICS AS CONSTRAINTS IN SOURCE ROUTING SWITCHING NETWORKS

(71) Applicant: T-Mobile USA, Inc., Bellevue, WA (US)

(72) Inventor: Cameron Byrne, Seattle, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,015

(22) Filed: Jan. 14, 2022

(65) Prior Publication Data

US 2022/0141132 A1  May 5, 2022

Related U.S. Application Data

(63) Continuation of application No. 16/911,176, filed on Jun. 24, 2020, now Pat. No. 11,265,245.

(51) Int. Cl.
*H04L 45/00* (2022.01)
*H04L 45/50* (2022.01)
*H04L 43/0823* (2022.01)

(52) U.S. Cl.
CPC .......... *H04L 45/70* (2013.01); *H04L 43/0823* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 6,785,262 B1 | 8/2004 | Yao et al. | |
| 7,822,278 B1* | 10/2010 | Hobbs | H04N 19/34 |
| | | | 382/232 |
| 9,749,187 B2 | 8/2017 | Filsfils et al. | |
| 11,265,245 B2* | 3/2022 | Byrne | H04L 45/34 |
| 2006/0126504 A1 | 6/2006 | Meier et al. | |
| 2007/0213038 A1* | 9/2007 | Masseroni | H04L 47/18 |
| | | | 455/414.3 |
| 2015/0071119 A1* | 3/2015 | Farkas | H04L 45/50 |
| | | | 370/255 |
| 2015/0281102 A1 | 10/2015 | Lee et al. | |
| 2016/0277959 A1* | 9/2016 | Venkataraman | H04L 47/805 |
| 2017/0295090 A1 | 10/2017 | Gopalan et al. | |
| 2019/0379591 A1* | 12/2019 | Boughzala | H04L 47/115 |
| 2020/0267751 A1* | 8/2020 | Shi | H04W 68/005 |
| 2020/0322412 A1 | 10/2020 | Kellicker et al. | |

* cited by examiner

*Primary Examiner* — Xavier S Wong
(74) *Attorney, Agent, or Firm* — Brownstein Hyatt Farber Schreck, LLP

(57) ABSTRACT

A label switching router for a switching network configured for source routing can be configured to modify one or more reported properties of a link associated with that router based on one or more link quality metrics. For example, a router can include a link with available bandwidth of 10 Gbps, a value that can be used by a headend when evaluating nodes of the network against a set of constraints required by a particular requested connection or tunnel. A link of that router may exhibit an increased bit error rate which can be used by the label switching router to artificially deflate available bandwidth, thereby reducing the number of label switching paths including the router are selected by the headend.

19 Claims, 4 Drawing Sheets

LINK QUALITY METRICS AS CONSTRAINTS IN SOURCE ROUTING SWITCHING NETWORKS

CROSS-REFERENCE TO RELATED APPLICATION(S)

This application is a continuation patent application of U.S. patent application Ser. No. 16/911,176, filed Jun. 24, 2020 and titled "Link Quality Metrics as Constraints in Source Routing Switching Networks," the disclosure of which is hereby incorporated herein by reference in its entirety.

TECHNICAL FIELD

Embodiments described herein relate to computer networks and, in particular, to network appliances in switching networks configured to modify one or more reported constraints based on one or more link quality metrics.

BACKGROUND

Conventional switching networks leverage a path computation element and/or a headend router to determine a shortest path to transit a packet from a source to a destination through the network. In many conventional implementations, constrained shortest path first routing or distance-vector based routing can be used to define a routing path.

However, links coupling transit nodes in a switching network are typically principally selected based on available bandwidth at a time that a path from a source to a destination is determined. As a result, suboptimal links (e.g., links with, or that develop, high bit error rates and/or high frame drop rates) may be selected to transport data merely because those links have high reported bandwidth availability.

SUMMARY

Embodiments described herein take the form of a machine-implemented method performed within a switching network to select a routing path through a set of transit nodes from a headend to an egress router. The method includes operations such as: determining, by a first transit node of the switching network, a link quality metric of a link between (1) the first transit node and (2) a second transit node of the switching network; modifying a reported available bandwidth of the link based on the link quality metric; and generating a message (e.g., flood message) into the switching network, the message including the modified available bandwidth.

Related and additional embodiments may include a configuration in which modifying the reported available bandwidth includes increasing the reported available bandwidth. In other examples, the reported available bandwidth may be increased by an amount proportional to the link quality metric. In further examples, the reported available bandwidth may be decreased by an amount based, at least in part, on the link quality metric.

Related and additional embodiments may include a configuration in which the link quality metric may be one of a bit error rate of the link or a frame error rate.

Some embodiments or implementations include a configuration in which modifying the reported available bandwidth of the link may be performed after determining that the link quality metric satisfies a threshold (e.g., percentage change, fixed value, and so on).

Further embodiments described herein take the form of a method of operating a label switching router in a switching network, the method operations such as: detecting a change in a link quality metric of a link coupling the label switching router to a transit node; determining whether the change satisfies a threshold and upon determining that the change does satisfy the threshold, modifying a reported property of the link based on the link quality metric; and generating a message such as a flood message into the switching network, the message including the modified reported property. Examples of the reported property include available bandwidth and latency.

Additional embodiments described herein take the form of a label switching router including at least a nonvolatile memory storing instructions, a working memory, and a processor coupled to the nonvolatile memory and the working memory. The processor in such example configurations can be configured to access the nonvolatile memory to retrieve the instructions and, in response, instantiate into the working memory an instance of a network service application. The network service application instance can be configured to: monitor one or more quality metrics of a link coupling the label switching router to a transit node of a switching network; modify a reported property of the link in response to determining that at least one link quality metric has changed; and report the modified reported property, in place of the reported property, to at least one other transit node of the switching network.

Related and additional embodiments may include a configuration in which the network service application may be configured to report the reported property, in place of the modified reported property, upon determining that the at least one link quality metric has returned to an original value.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
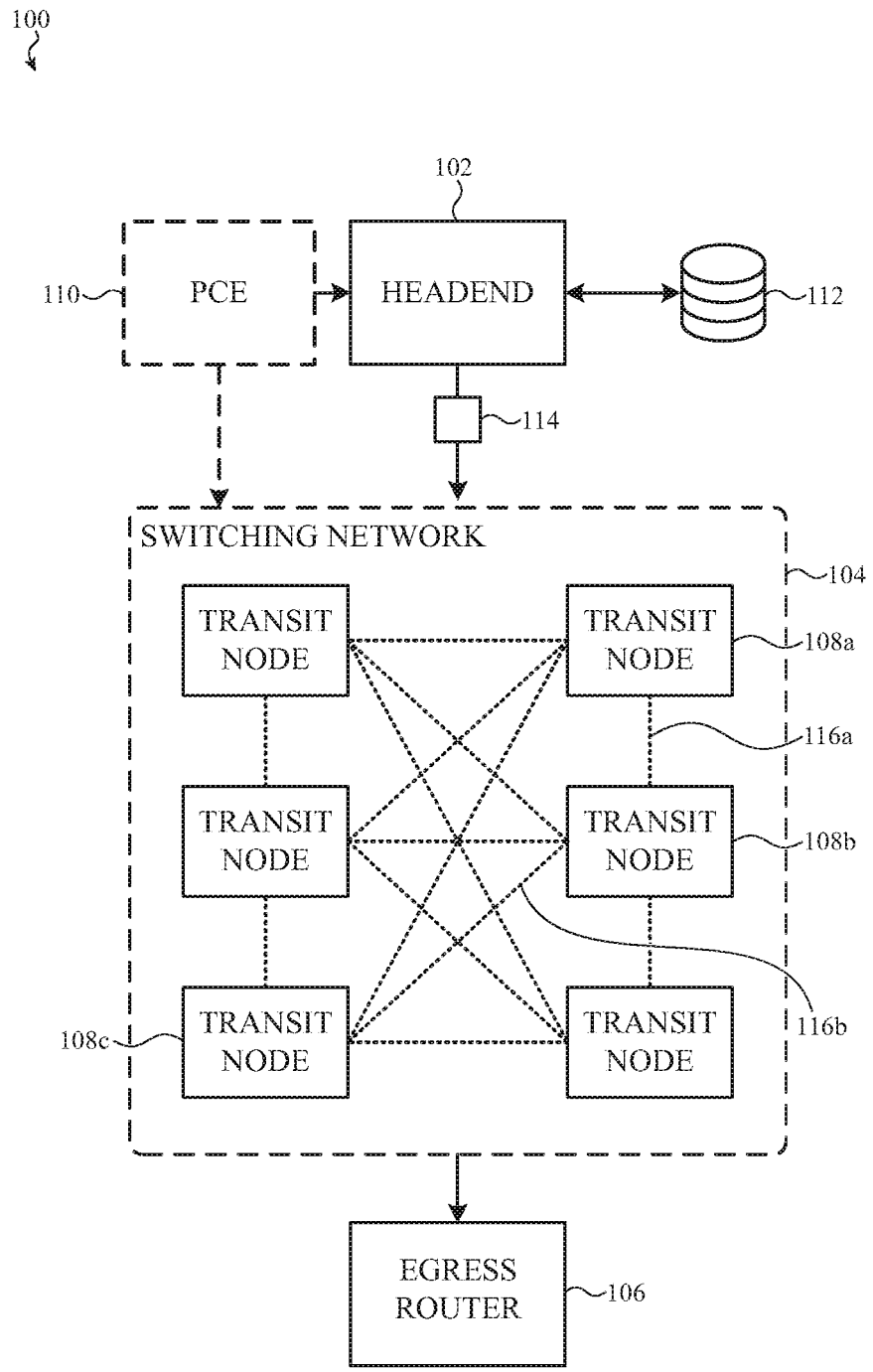
FIG. 1 depicts a system diagram of a switching network, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to computer networks, and in particular, to systems and methods for more efficiently operating an autonomous switching network that uses source routing.

As used herein, the phrase "source routing" and related terms and phrases may refer to any switching network architecture for which a path through a series of interconnected or internetworked routers (also referred to as "transit nodes") between a source of data (e.g., a packet) and a destination of that data is predefined before the data is transmitted across that path through the network. Autonomous networks configured for source routing can implement, for example, the Resource Reservation Protocol for Traffic Engineering ("RSVP-TE") standard, the Multiprotocol Label Switching ("MPLS") standard, or any other suitable label switching or packet switching standard or protocol. For simplicity of description, many embodiments that follow reference a network architecture implementing the RSVP-TE standard, but it may be appreciated that this is merely one example and that other constructions can implement different or additional standards for routing packets from a source to a destination.

In particular, for embodiments described herein, link quality metrics are used to inflate or deflate or otherwise modify one or more network performance or availability parameters (e.g., shared-risk link group(s), bandwidth, color, affinity, and so on) associated with a particular transit node or a particular link communicably coupling two transit nodes of the network. As a result of these modifications, transit nodes and/or links that become lossy (e.g., frame drop rate increases, bit error rate increases, and so on) for one reason or another (e.g., hardware failure, infrastructure interruption, and so on) can automatically and quickly be excluded from future route paths until issues with that transit node and/or link can be resolved.

For example, a switching network as described herein includes a switching network which includes a headend router (simply, a "headend") that receives a packet to route through the network. The packet and/or an encapsulation of the packet identifies a destination of that packet which, in turn, defines an egress router (an "egress router"). Communicably coupling the headend to the egress router is a network of label switching routers ("LSRs"), referred to herein as transit nodes. Each transit node of the switching network is coupled to at least one other transit node by a physical link referred to as a "link." As noted above, the transit nodes, the headend, and/or the egress router can implement RSVP-TE, MPLS, or any other suitable routing protocol to transport the packet from the headend to the egress router in an efficient manner.

In many constructions, upon receiving the packet, the headend and/or a path computation unit may calculate a path (a "label-switched path" or "LSP") to be taken by the packet through the switching network. In many embodiments, the label-switched path is calculated to be the shortest path through the network that couples the headend to the egress router. In particular, for embodiments described herein, a constraint-based shortest path calculation can be performed. In these examples, link and transit node state information can be obtained from a traffic engineering database communicably coupled to the headend and/or the path computation unit.

The link and transit node state information can be used to filter out (e.g., exclude) transit nodes that do not meet minimum requirements to send the packet from the headend to the egress router. As may be appreciated, such an operation is often referred to as a constraint-based operation; minimum requirements to send the packet from the headend to the egress router define a set of constraints. Example constraints include minimum required bandwidth, color, affinity, latency, and so on. For example, the packet may be associated with a high bandwidth task such as streaming media. In these examples, the headend and/or the path computation unit may use link and transit node state information obtained from the traffic engineering database (and/or another source) to exclude nodes and/or links that do not satisfy constraints. As noted above, in conventional implementations of RSVP-TE and/or MPLS networks, bandwidth is typically a primary constraint.

Once the set of all possible transit nodes of the switching network have been limited by filtering by bandwidth (and/or other network or node state properties) to a smaller set of candidate transit nodes, the headend and/or the path computation unit can leverage Dijkstra's algorithm to determine which nodes and associated links cooperate to define the shortest (or otherwise "best") path between the headend and the egress router. Once this shortest path solution is determined, the label-switched path used to transit the packet from the headend to the egress router is defined.

Thereafter, in some examples, the headend and/or the path computation unit can generate an explicit route object ("ERO") which identifies each transit node and each link of the label-switched path. The ERO can be transmitted via a path message into the switching network such that transit nodes and links that are identified by the ERO can reserve bandwidth in advance of establishing the label-switched path. Once the label-switched path is defined, a unidirectional (or bidirectional, in some cases) tunnel is established between the headend and the egress router and the packet may be transmitted therethrough, hopping between transit nodes across one or more links that cooperate to define the label-switched path.

More particularly, embodiments described herein reference systems and methods for modifying constraints based on real-time link quality metrics. As a result of these architectures, robust and reliable communication across a switching network by ensuring that links with high error rates and/or high frame rates are not allocated as frequently as links without errors.

For example, a transit node of a switching network as described herein may be associated with a link that, at some time, triggers elevated bit error rates. As may be known to a person of skill in the art, bit errors can be caused by, for example, electrical interference or thermal noise. In response to detecting increased bit errors (e.g., by comparing a real-time bit error rate against a threshold), the transit node of an embodiment described herein can artificially decrease an internal meter reporting bandwidth available across the link. For example, in some cases, the transit node can send a flood message (e.g., Interior Gateway Protocol or "IGP" flood message) to inform other transit nodes and/or other network appliances in the switching network that the link has reduced available bandwidth. As a result of the lower reported bandwidth (which is artificially deflated in response to the increased bit error rate), the link and, correspondingly, the transit node, will be excluded from label-switched paths determined by a headend because the transit node will fail to meet minimum bandwidth requirements.

In another example, a transit node with a 10 Gbps of available bandwidth may have a link that begins to exhibit a bit error rate of 1% due to thermal noise affecting the link. In response, the transit node automatically adjusts its internal available bandwidth meter to 1 Gbps of available bandwidth. The transit node may thereafter generate and send an IGP flood message informing other nodes of the network that the transit node has 1 Gbps of available bandwidth. As a result of this adjustment and reporting, the transit node will fail to satisfy constraints associated with a high-bandwidth data transfer task that requires a minimum 2 Gbps; a label-switched path defined to service the high-bandwidth task will not include this transit node. The transit node may still be used to service lower-bandwidth data transfer/routing tasks.

At a later time, if the error rate drops (e.g., thermal noise is no longer affecting the link), the transit node of the preceding example can true its internal bandwidth meter back to 10 Gbps.

In further examples, other internal meters of a transit node such as described herein can be biased, adjusted, inflated, or deflated in order to prevent a particular transit node from satisfying constraints of particular data transfer/routing tasks. For example, some embodiments may modify affinity, color, latency, jitter, and/or bandwidth.

In view of the foregoing, generally and broadly, embodiments described herein reference techniques for changing the behavior of an autonomous switching network. In particular, LSRs/transit nodes of a given switching network can falsify, bias, distort, or otherwise change one or more properties thereof to cause headends to ignore that node until error rates affecting performance of that node (or links associated therewith) are reduced. In this manner, link quality metrics, such as bit error rate and/or frame drop rates, can be leveraged by individual transit nodes to improve the performance of the entire switching network.

More specifically, as may be appreciated by a person of skill in the art, a switching network as described herein may autonomously operate in a manner than prefers error-free links over higher-bandwidth but more error-prone links. As a result of these architectures, overall performance of the network improves because, although certain label-switched paths through that network may not be the absolute shortest path, chosen/selected paths will exhibit exceptionally low error rates, which in turn, increases overall throughput of the network.

Further to the foregoing, it may be appreciated that higher-order control over the various techniques as described herein can result in improved bandwidth utilization through a network, improved incident response times, and overall improved operation. In particular, it may be appreciated that different LSRs/transit nodes can be configured to bias different properties to different degrees and/or in response to different thresholds or other triggers or stimulus.

For example, in some embodiments, a first switching network can include one or more LSRs/transit nodes configured to modify reported bandwidth in inverse proportion to a dropped frame rate. In other words, as frames are dropped across a link of the first network, nodes associated with that link can artificially reduce reported bandwidth so that the link is utilized less frequently than other links. The proportional relationship between the frame drop rate and the adjustment made to reported available bandwidth can be any suitable relationship. In some examples, a percentage change in the frame drop rate can be used to determine a corresponding percentage change to the bandwidth. For example, if a frame drop rate increases by 200% (e.g., increases from 1% to 3%), then reported available bandwidth may reduce by 33%. In another example, if the frame drop rate increases by 1 percentage point (e.g., from 1% to 2%), reported available bandwidth can be dropped by 10%. These foregoing examples are not exhaustive; it may be appreciated that a relationship between an error rate (or more generally any link quality metric) can inform any suitable change in reported available bandwidth.

Continuing the preceding example, a second switching network can include one or more LSRs/transit nodes configured to modify reported latency in proportion to a link quality metric such as bit error rate. In other words, as bit error rate of a particular link increases, the latency of that link is artificially increased or otherwise biased, thereby causing the link to be utilized less frequently than other links.

In still further examples, a third switching network can include one or more LSRs/transit nodes configured to modify reported latency and reported bandwidth in response to one or more link quality metrics. For example, the third switching network may be configured to modify latency in response to changes in bit error rate and configured to modify available reported bandwidth in response to changes in dropped frame rate.

In other cases, a fourth switching network can include one or more LSRs/transit nodes that are configured to modify different reported properties (e.g., latency, bandwidth, color, affinity, jitter, and so on) in response to different link quality metrics. For example, a first LSR can be configured to modify a reported bandwidth based on bit error rate of that link whereas a second LSR of the same switching network can be configured to modify a reported latency based on a different link quality metric, such as frame drop rate.

More generally, it may be appreciated that any one (or more) suitable reported property of any link can be modified, biased, changed, or otherwise adjusted in response to any one (or more) link quality metric, thereby causing that link to fail constraint filtering for certain data routing tasks. Further embodiments include a higher-order control architecture monitoring LSRs/transit nodes in a given switching network to optimize which properties of which nodes are biased in response to which link quality metrics. In some cases, the higher-order control architecture can be autonomous and/or can leverage a trained model (or other machine learning system) to control which nodes and/or which properties of which nodes are artificially inflated or deflated, such as described herein. In some cases, an LSR as described herein can be configured to modify multiple properties in response to multiple link quality metrics.

Further, it may be appreciated that properties of LSRs/transit nodes may only be modified in certain circumstances. For example, a modification to reported bandwidth may, in some embodiments, only be made after an associated link quality metric exceeds a threshold. Thereafter, an amount of modification to the reported bandwidth may depend on the associated link quality metric, a derived property of the associated link quality metric, a fixed value, and so on. In still further examples, a system as described herein may only configure certain LSRs/transit nodes in a network to modify reported metrics or properties. Other LSRs/transit nodes of the same switching network may be operated in a conventional or default mode of operation.

In still further cases, LSRs/transit nodes as described herein may be configured to modify one or more reported metrics in response to one or more link quality metrics at certain times or in response to certain external triggers. Examples include administrative modes or settings, maintenance flags or modes, schedules, traffic types, and so on. It may be appreciated that these examples are not exhaustive.

In addition to the foregoing described advantages of a system described herein, it may be appreciated that embodiments described herein can additionally extend life of service for legacy networking appliances configured for source routing, but not configured to consume link quality metrics when making LSP decisions.

These foregoing and other embodiments are discussed below with reference to FIGS. 1-4. However, those skilled in the art will readily appreciate that the detailed description given herein with respect to these figures is for explanation only and should not be construed as limiting.

FIG. 1 depicts a system diagram of a switching network, such as described herein. The network 100 includes a headend 102, a switching network 104, and an egress router 106. The network 100 can implement any suitable packet or label switching protocol or standard to orchestrate data transit tasks from the headend to the egress router 106. The switching network 104 includes a number of transit nodes or label-switching routers. In the illustrated embodiment, six different transit nodes are shown, three of which are labeled as the transit nodes 108*a*, 108*b*, 108*c*.

Each of the headend 102, the transit nodes of the switching network 104, and the egress 106 router may be generally and broadly referred to as a "network appliance." In many configurations, the network appliance is a router, but this may not be required of all embodiments. More generally and broadly, each of these network appliances can be implemented as any suitable virtual or physical component of a switching network configured to communicably couple to and/or participate in a switching network such as the network 100.

Accordingly, more broadly, it is understood that the network 100 can be configured to exchange packetized information between nodes of that network to transit that packetized information from a source to a destination. In particular, although not illustrated, a source of a particular packet may be a computing device or computing network (or other computing resource) communicably coupled to the headend 102. Similarly, a destination of a particular packet may be a computing device or computing network (or other computing resource) communicably coupled to the egress router 106. In some cases, the switching network can be a MPLS configured network, an RSVP-TE configured network, or may be configured to conform to another protocol/standard or a set of protocols or standards. A person of skill in the art will readily appreciate that a number of suitable switching or data exchange systems can leverage the systems and methods described herein.

Each network appliance of the network 100 can be configured to receive packets from other network appliances across a physical link defined between them. Upon receiving a packet from a source (e.g., another network appliance or computing device), each respective network appliance is configured to forward the packet to a destination (e.g., another network appliance or computing device) that is defined by the packet, or an encapsulation of the packet. In particular, conventionally each packet includes a network layer header and a payload. The network layer header identifies, by address, the source and the destination of that particular packet and the payload includes transport layer information intended to be consumed by an electronic device or network appliance associated with the destination.

In these examples and embodiments, each network appliance includes at least an input port and an output port. The input port receives the packet from a source and, correspondingly, the output port forwards that packet along a label-switch path to the destination.

Each network appliance of the network 100 can be implemented in hardware or software and may be associated with one or computational resources that can be allocated to perform, coordinate, or schedule one or more tasks or operations of each respective network appliance. The resource allocations assigned to a given network appliance can include virtual and/or physical hardware. For simplicity of description, each network appliance described below is a physical hardware appliance, but it may be appreciated that, in other implementations, a network appliance may be partially or entirely virtualized, containerized, or otherwise implemented.

In the illustrated embodiment of the network 100, each respective network appliance includes a processor and a memory. The memory can be a nonvolatile memory configured to store executable instructions and other computational assets that can be accessed by the processor. In particular, the processor can be configured to access the memory in order to retrieve one or more executable instructions that, when executed by the processor, cause the processor to instantiate an instance of software configured to provide a networking service. In some embodiments, the instance of software can be referred to as a network service application. A network service application, such as described herein, can be configured to leverage resources allocated to a given network appliance in order to provide a networking function such as routing, packet shaping, firewall functions, and so on.

The processor of a network appliance can leverage a working memory to support one or more instances of software, such as a network service application. The working memory can be a volatile memory that can be accessed by and used by the processor at high speed.

While performing a networking function such as routing, the processor of each network appliance of the network 100 can maintain one or more metrics and/or counters that describe one or more operational characteristics of the network appliance. For example, as noted above, each network appliance (e.g., the headend 102, each transit node of the switching network 104, and the egress router 106) can be configured as a router and may maintain one or more dropped packet counters and currently allocated/reserved bandwidth.

As noted above, the network 100 can be configured for source routing. As may be appreciated by a person of skill in the art, a network configured for source routing delegates a headend or a path computation element to determine a label-switch path from the headend 102, through one or more transit nodes of the switching network 104, to the egress router 106. In many cases, the path-determining element (whether a headend router or a path computation element, such as the path computation element 110) can leverage a shortest path determination algorithm such as a Dijkstra's algorithm.

As noted above, the shortest path determination operation typically occurs after one or more transit nodes are excluded from consideration because those nodes or, rather, one or more properties thereof, do not satisfy a constraint to transit the packet through the network 100. For example, as noted above, a transit node may be excluded (fail constraints) if the packet is associated with a request for high bandwidth, but a particular transit node and/or link associated with that transit node does not have sufficient bandwidth.

More specifically, when determining an LSP from the headend 102 to the egress router 106 of the network 100, the headend 102 may access a traffic engineering database 112 to determine one or more link state or node state properties (e.g., bandwidth) of one or more transit nodes of the switching network 104. The node/link state properties can be broadcast by each individual node into the network (e.g., via an IGP flood message or similar). Alternatively, node/link state properties can be transmitted to the traffic engineering database 112 directly from each respective transit node.

The obtained properties can thereafter be used to exclude one or more transit nodes of the switching network from consideration, after which Dijkstra's algorithm can be applied to determine a (constrained) shortest path through the switching network 104 from the headend 102 to the egress router 106. As noted above, the headend 102 may define an explicit route object 114 and may send that ERO into the switching network so that a tunnel can be created according to the determined path.

For example, in one embodiment, the headend 102 may determine that a connection from the headend 102 to the egress router 106 traverses from the transit node 108a from the headend 102, across the link 116a to the transit node 108b, across the link 116b to the transit node 108c, and thereafter, from the transit node 108c to the egress router 106.

In these embodiments, as noted above, each transit node of the switching network 104 can be configured to monitor one or more internal meters that represent or describe one or more link quality metrics. As noted above, link quality metric examples include bit error rates and dropped frame rates.

As each respective node (or a subset of nodes) monitors its internal error rate meters, one or more reported node/link properties reported by that respective node may be changed, as noted above. For example, if the transit node 108a determines that a bit error rate across the link 116a has increased beyond a threshold, the transit node 108a may bias its own internal meter describing available bandwidth over the link 116a and/or report (e.g., via an IGP flood message) that available bandwidth over the link 116a has dropped. As noted above, this action will cause the link 116a to be included in LRPs determined by the headend 102 less frequently.

In other cases, as noted above, other properties can be modified based on other link quality metrics. Examples include, but are not limited to: changing a link color based on jitter; changing a link affinity based on bit error rate; changing an available bandwidth based in part on bit error rate and in part on frame drop rate; changing a latency based on one or more of bit error rate or frame drop rate; and so on. Such operations can be performed, in part, by a network service application, such as described herein.

In view of the foregoing, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
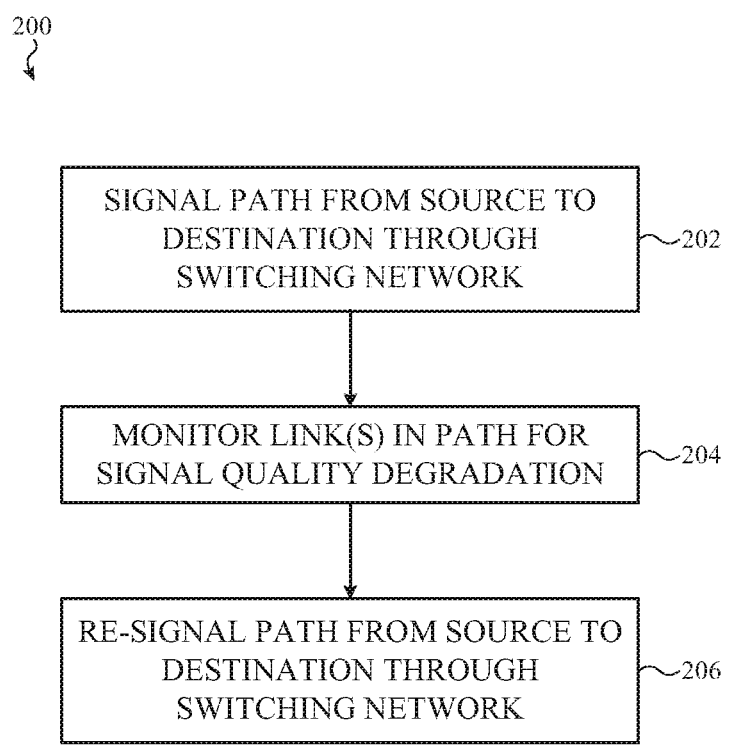
FIG. 2 is a flowchart depicting example operations of a method of operating a network appliance in a switching network, such as described herein.
Figure 3:
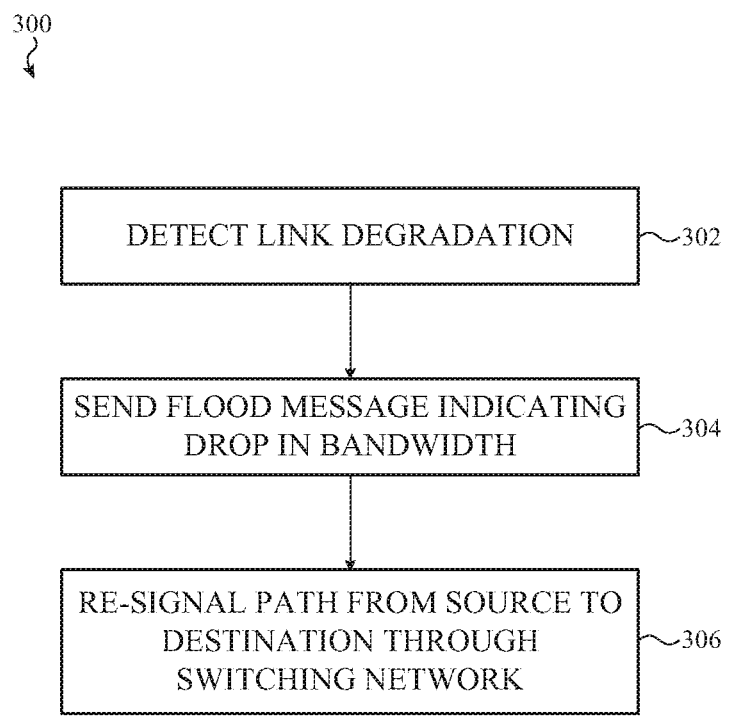
FIG. 3 is a flowchart depicting example operations of another method of operating a network appliance in a switching network, such as described herein.
Figure 4:
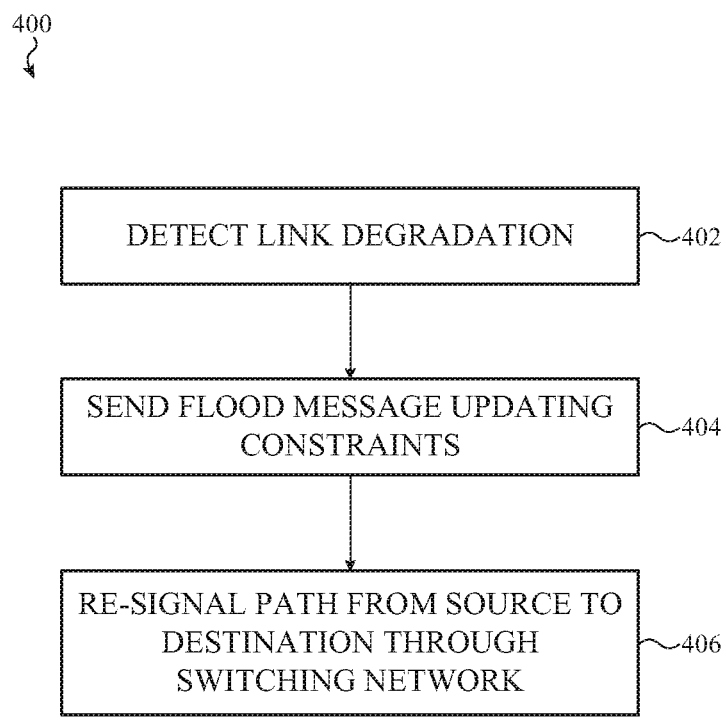
FIG. 4 is a flowchart depicting example operations of another method of operating a network appliance in a switching network, such as described herein.

Generally and broadly, FIGS. 2-4 are flowcharts depicting various operations associated with a system described herein. In particular, these methods and operations depicted and described serve to affect network behavior based on artificially inflating or changing one or more link or node status metrics based on link quality metrics.

For example, FIG. 2 is a flowchart depicting example operations of a method of operating a network appliance in a switching network, such as described herein. The method 200 can be performed, in whole or in part, by a network appliance and/or a network service application instance, such as described herein. In some example constructions, a network appliance is a router and/or a network service application performs a routing function.

The network appliance can include a housing that encloses and supports one or more operational components often referred to as computing resources. Such computing resources can include a processor and a memory. The memory in many example constructions can take multiple forms such as a persistent memory suitable for storing executable instructions that can be accessed by the processor to instantiate one or more purpose-configured instances of software that may, in some embodiments, perform or facilitate one or more virtual or physical networking functions. Another example memory is a working memory that can be communicably coupled to the processor and may be leveraged by the processor when instantiating software as described herein and as may be known to a person of skill in the art.

A network appliance as described herein may further include, in some examples, one or more inputs and/or one or more outputs. Conventionally, such inputs and outputs are referred to as input ports and output ports. The input and output ports of a network appliance can be communicably coupled to the processor and/or to the memory and can be configured to physically and/or communicably couple to one or more other networking appliances.

The method 200 includes operation 202 at which a path from a source to a destination is signaled, defining a tunnel from the source to the destination through which packets can pass. In some cases, a path signal may be used to distribute an explicit route object to one or more transit nodes in the network. Next, at operation 204, the network appliance and/or another computing device communicably coupled to the network appliance monitors for a change in one or more link quality metrics. In particular, the network appliance (or other device) monitors for a degradation of the link quality.

As noted above, a degradation can be defined differently in different embodiments and/or different implementations. For example, in one embodiment, a degradation may be defined by percentage change. In other cases, a degradation may be defined as an absolute value change. In yet other examples, the degradation may be defined as a particular link quality metric satisfying a threshold. These foregoing examples are not exhaustive; it may be appreciated that a network appliance and/or a computing device communicably coupled to a network appliance (e.g., configured to access internal meters of the network appliance via an application programming interface) can define a degradation of any suitable link quality metric in any suitable manner.

Thereafter at operation 206, the method 200 advances to re-define a label-switch path by re-signaling the path through the network, defining a new tunnel from the source to the destination.

FIG. 3 is a flowchart depicting example operations of another method of operating a network appliance in a switching network, such as described herein. The method 300 can be performed by any suitable network appliance, such as the network appliance described above in reference to FIG. 2; this description is not repeated.

The method 300 includes operation 302 at which a link degradation is detected. As noted above, link degradation can be defined in a number of suitable ways and may vary from embodiment to embodiment. Thereafter, at operation 304, the method 300 advances to send a flood message, such as an IGP flood message, within the network to indicate a drop in bandwidth. Finally, at operation 306, the method 300 advances to re-define a label-switch path by re-signaling the path through the network, defining a new tunnel from the source to the destination.

FIG. 4 is a flowchart depicting example operations of another method of operating a network appliance in a switching network, such as described herein.

The method 400 includes operation 402 at which a link degradation is detected. As noted above, link degradation can be defined in a number of suitable ways and may vary from embodiment to embodiment. Thereafter, at operation 404, the method 400 advances to send a flood message, such as an IGP flood message, within the network to indicate a change in one or more constraints that inform label-switching path determination (e.g., bandwidth, latency, color, affinity, and so on). Finally, at operation 406, the method 400 advances to re-define a label-switch path by re-signaling the path through the network, defining a new tunnel from the source to the destination.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As used herein, the terms "networking resource" and/or "computing resource" (along with other similar terms and phrases, including, but not limited to, "network appliance" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

What is claimed is:

1. A machine-implemented method performed within a switching network to select a routing path through a set of transit nodes from a headend to an egress router, the method comprising:

determining, by a first transit node of the switching network, that a bit error rate, a dropped frame rate, or a frame error rate of a link between the first transit node and a second transit node of the switching network has increased above a threshold;

decreasing a reported available bandwidth of the link, the reported available bandwidth being a value that is reported and is independent of an actual available bandwidth of the link;

generating a message into the switching network, the message comprising the reported available bandwidth;

determining that the bit error rate, the dropped frame rate, or the frame error rate has increased above an additional threshold;

decreasing the reported available bandwidth of the link;

generating an additional message into the switching network, the additional message comprising the reported available bandwidth; and changing the threshold.

2. The method of claim 1, wherein the reported available bandwidth is increased by an amount proportional to the bit error rate, the dropped frame rate, or the frame error rate.

3. The method of claim 1, further comprising:
determining that the bit error rate, the dropped frame rate, or the frame error rate has decreased to at least the threshold; and
increasing the reported available bandwidth of the link.

4. The method of claim 1, wherein the threshold is a percentage change.

5. The method of claim 1, wherein the threshold is a fixed value.

6. The method of claim 1, wherein the message is a flood message.

7. A machine-implemented method performed within a switching network to select a routing path through a set of transit nodes from a headend to an egress router, the method comprising:
determining, by a first transit node of the switching network, that a bit error rate, a dropped frame rate, or a frame error rate of a link between the first transit node and a second transit node of the switching network has increased above a threshold;
decreasing a reported available bandwidth of the link, the reported available bandwidth being a value that is reported and is independent of an actual available bandwidth of the link;
generating a message into the switching network, the message comprising the reported available bandwidth;
determining that the bit error rate, the dropped frame rate, or the frame error rate has decreased to at least the threshold;
increasing the reported available bandwidth of the link;
generating an additional message into the switching network after increasing the reported available bandwidth of the link, the additional message comprising the reported available bandwidth; and
changing the threshold.

8. A machine-implemented method performed within a switching network to select a routing path through a set of transit nodes from a headend to an egress router, the method comprising:
determining, by a first transit node of the switching network, that a bit error rate, a dropped frame rate, or a frame error rate of a link between the first transit node and a second transit node of the switching network has increased above a threshold;
decreasing a reported available bandwidth of the link, the reported available bandwidth being a value that is reported and is independent of an actual available bandwidth of the link;
generating a message into the switching network, the message comprising the reported available bandwidth;
decreasing a reported latency of the link upon determining that that the bit error rate, the dropped frame rate, or the frame error rate has increased above an additional threshold;
generating an additional message into the switching network after decreasing the reported latency of the link, the additional message comprising the reported latency; and
changing the threshold.

9. A method of operating a label switching router in a switching network, the method comprising:
determining that a bit error rate, a dropped frame rate, or a frame error rate of a link coupling the label switching router to a transit node that has a reported available bandwidth below an actual available bandwidth has decreased below a threshold;
increasing the reported available bandwidth, the reported available bandwidth being a value that is reported and is independent of the actual available bandwidth;
generating a message into the switching network, the message comprising the reported available bandwidth;
determining that the bit error rate, the dropped frame rate, or the frame error rate has decreased to at least the threshold;
decreasing the reported available bandwidth of the link;
generating an additional message into the switching network after decreasing the reported available bandwidth of the link, the additional message comprising the reported available bandwidth; and
changing the threshold.

10. The method of claim 9, wherein the message is a flood message.

11. The method of claim 9, wherein the additional message is a flood message.

12. A method of operating a label switching router in a switching network, the method comprising:
determining that a bit error rate, a dropped frame rate, or a frame error rate of a link coupling the label switching router to a transit node that has a reported available bandwidth below an actual available bandwidth has decreased below a threshold;
increasing the reported available bandwidth, the reported available bandwidth being a value that is reported and is independent of the actual available bandwidth;
generating a message into the switching network, the message comprising the reported available bandwidth;
increasing a reported latency of the link upon determining that the bit error rate, the dropped frame rate, or the frame error rate has decreased to at least the threshold;
generating an additional message into the switching network after increasing the reported latency of the link, the additional message comprising the reported latency; and
changing the threshold.

13. The method of claim 12, further comprising:
decreasing the reported latency of the link upon determining that that the bit error rate, the dropped frame rate, or the frame error rate has decreased below the threshold; and
generating a third message into the switching network after increasing the reported latency of the link, the third message comprising the reported latency, the message being a first message, the additional message being a second message.

14. A method of operating a label switching router in a switching network, the method comprising:
determining that a bit error rate, a dropped frame rate, or a frame error rate of a link coupling the label switching router to a transit node that has a reported available bandwidth below an actual available bandwidth has decreased below a threshold;
increasing the reported available bandwidth, the reported available bandwidth being a value that is reported and is independent of the actual available bandwidth;
generating a message into the switching network, the message comprising the reported available bandwidth;

determining that the bit error rate, the dropped frame rate, or the frame error rate has decreased below an additional threshold;
increasing the reported available bandwidth of the link;
generating an additional message into the switching network, the additional message comprising the reported available bandwidth; and
changing the threshold.

15. A method of operating a label switching router in a switching network, the method comprising:
   determining that a bit error rate, a dropped frame rate, or a frame error rate of a link coupling the label switching router to a transit node that has a reported available bandwidth below an actual available bandwidth has decreased below a threshold;
   increasing the reported available bandwidth, the reported available bandwidth being a value that is reported and is independent of the actual available bandwidth;
   generating a message into the switching network, the message comprising the reported available bandwidth;
   decreasing a reported latency of the link upon determining that the bit error rate, the dropped frame rate, or the frame error rate has increased above an additional threshold;
   generating an additional message into the switching network after decreasing the reported latency of the link, the additional message comprising the reported latency; and
   changing the threshold.

16. A label switching router comprising:
   a nonvolatile memory storing instructions;
   a working memory; and
   a processor coupled to the nonvolatile memory and the working memory and configured to access the nonvolatile memory to retrieve the instructions and, in response, instantiate into the working memory an instance of a network service application, the network service application configured to:
      upon determining that a bit error rate, a dropped frame rate, or a frame error rate of a link coupling the label switching router to a transit node has increased above a threshold:
         decreasing a reported available bandwidth of the link, the reported available bandwidth being a value that is reported and is independent of an actual available bandwidth of the link; and
         generating a first message into a switching network, the first message comprising the reported available bandwidth; and
      upon determining that the bit error rate, the dropped frame rate, or the frame error rate has decreased to at least the threshold:
         increasing the reported available bandwidth of the link; and
         generating a second message into the switching network, the second message comprising the reported available bandwidth;
      upon determining that the bit error rate, the dropped frame rate, or the frame error rate has increased above an additional threshold:
         decreasing a reported latency of the link; and
         generating a third message into the switching network, the third message comprising the reported latency; and
      changing the threshold.

17. The label switching router of claim 16, wherein the threshold is a percentage change.

18. The label switching router of claim 16, wherein the threshold and the additional threshold are different.

19. The label switching router of claim 16, wherein the network service application is further configured to, upon determining that the bit error rate, the dropped frame rate, or the frame error rate has decreased to at least the additional threshold:
   increasing the reported latency of the link; and
   generating a fourth message into the switching network, the fourth message comprising the reported latency.

* * * * *